March 9, 1954 F. KREIS 2,671,349
AUTOMATICALLY OPERATING CHANGE-SPEED GEAR
Filed June 2, 1951
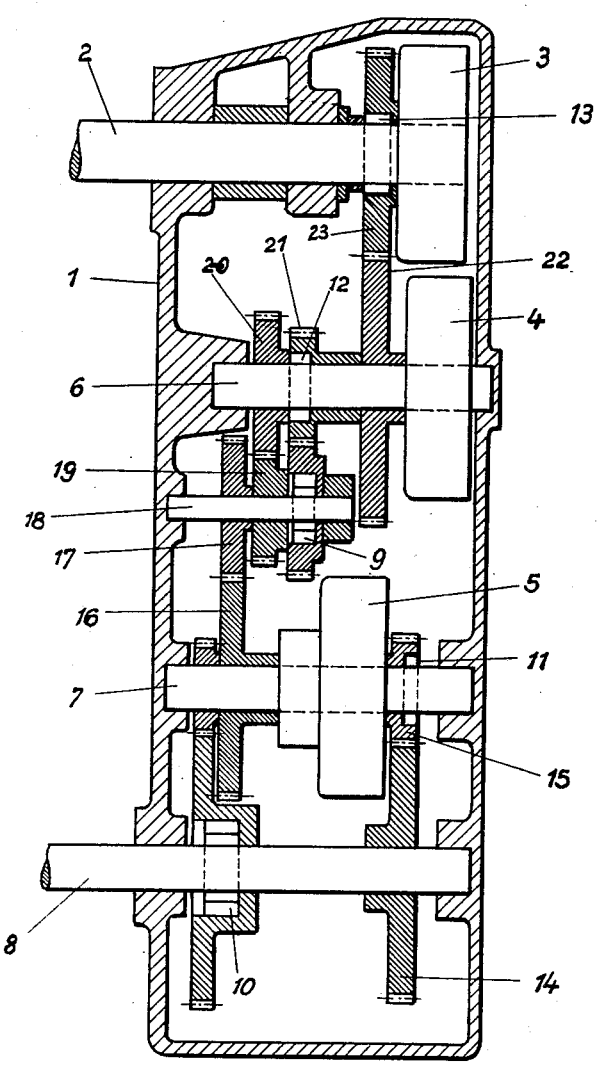
Inventor:

Patented Mar. 9, 1954

UNITED STATES PATENT OFFICE 2,671,349

AUTOMATICALLY OPERATING CHANGE-SPEED GEAR

Fritz Kreis, Wurzburg, Germany

Application June 2, 1951, Serial No. 229,557

6 Claims. (Cl. 74—336)

This invention relates to automatically operating change speed gears particularly intended for motor vehicles, in which for the shifting of the single speed stages, a centrifugal clutch is employed for each of said stages and each of the stages lying below the highest one contains an overtaking clutch. In connection with such gears, in motor vehicles including motorcycles, difficulty has been experienced in that when the motor is to be started by towing or pushing the vehicle, high speed must be attained, such a speed in the region of 20-30 M. P. H. being not easily reached without considerable pushing effort and may hardly be obtained by persons.

This method of starting the motor by towing or pushing the car is however necessary, for instance when the starting battery is run down or when the motor of a motorcycle is so cold that it does not respond to turning by use of the kickstarter. According to this invention, starting of the motor by pushing the car is made possible by the fact that the power connection between the engine and the driving wheels which is interrupted by the centrifugal and overtaking clutches, when the motor is at a stillstand, is again closed by means of oppositely directed overtaking clutches, the number of which corresponds to the above mentioned interruptions.

Advantageously, each of these oppositely directed overtaking clutches is constructed similar to free wheel mechanism.

The accompanying drawing shows, by way of example, a sectional view of a gear according to this invention.

The shaft 2, driven by the motor of the vehicle, is supported in a box 1. The starting clutch 3 is fixed on this shaft and serves simultaneously as the first speed stage. Two further centrifugal clutches 4 and 5 for the second and third speed stages are arranged on respective shafts 6 and 7.

The drive is transmitted through shaft 8 which is also supported in box 1. The shafts are connected between them through gear wheels, of which gear wheels 14, 16, 17, 19 and 20 are fixed on their respective shafts, while gear wheels 15, 21 and 22 are free on their shafts but are fixed with their respective clutches. The gear wheel 15 forms parts of clutch 5, the gear wheel 23 form part of clutch 3 and the gear wheels 21, 22 form parts of clutch 4.

When the motor shaft is rotating, the power connection passes through clutches 3, 4 and 5, free wheels 9 and 10 and the respective gear wheels. When the motor is at a standstill and the vehicle is pushed, so that the drive comes through shaft 8, the power connection will be interrupted in the clutches 3, 4, 5 and the free wheels 9, 10.

These interruptions of the power connection are closed, according to the invention, by means of oppositely directed overtaking clutches, which in the embodiment shown in the drawing consist of the opposite free wheel mechanisms 11, 12 and 13. Now the power connection passes from shaft 8, through gear wheels 14, 15 and free wheel 11 to shaft 7; from here it passes through wheels 16 and 17 to shaft 18 and from this through wheels 19 and 20 to shaft 6. Further, from shaft 6, the power connection passes through free wheel 12, wheels 21, 22 and 23, free wheel 13 to shaft 2 which rotates the motor.

What I claim is:

1. In a change speed gear arrangement for a vehicle, in combination, a drive shaft; a centrifugal clutch means mounted on said drive shaft and including a freely rotatable member coupled at a predetermined speed of said drive shaft to the same; a driven shaft; transmission means connecting said freely rotatable member with said driven shaft; and an overrunning clutch connecting said freely rotatable member with said drive shaft when said freely rotatable member is driven from said driven shaft through said transmission means while said freely rotatable member is disengaged from said drive shaft and the vehicle is pushed so that the speed of said freely rotatable member exceeds the speed of said drive shaft.

2. In a change speed gear arrangement for a vehicle, in combination, a drive shaft; a centrifugal clutch means mounted on said drive shaft and including a freely rotatable member coupled at a predetermined speed of said drive shaft to the same; a driven shaft; transmission means connecting said drive shaft with said driven shaft and including a connecting member loosely mounted on said drive shaft and fixedly connected to said freely rotatable member; and an overrunning clutch connecting said connecting member with said drive shaft when said connecting member is driven from said driven shaft through said transmission means while said freely rotatable member is disengaged from said drive shaft and the vehicle is pushed so that the speed of said connecting member exceeds the speed of said drive shaft.

3. In a change speed gear arrangement for a vehicle, in combination, a drive shaft; a first centrifugal clutch means mounted on said drive shaft and including a first freely rotatable member connected at a predetermined speed of said drive shaft to the same; a first driven shaft; a second centrifugal clutch means mounted on said first driven shaft and including a second freely rotatable member connected at a predetermined speed of said first driven shaft to the same; gear transmission means including a first connecting member loosely mounted on said drive shaft and fixedly connected to said first freely rotatable member, and a second connecting member loosely mounted on said first driven shaft and fixedly connected to said second freely rotatable member; first overrunning clutch means connecting said first connecting member with said drive shaft when said first connecting member is driven from said first driven shaft while the vehicle is pushed so that the speed of said first connecting member exceeds the speed of said drive shaft; second overrunning clutch means connecting said second connecting member with said first driven shaft when the speed of said second connecting member exceeds the speed of said first driven shaft; a second driven shaft; gear means connecting said first driven shaft with said second driven shaft; further transmission means connecting said second connecting member with said second driven shaft so that when said second connecting member is driven from said second driven shaft while the vehicle is pushed the speed of said second connecting member exceeds the speed of said first driven shaft; a third connecting member loosely mounted on said second driven shaft; and third overrunning clutch means connecting said third connecting member with said second driven shaft when the speed of said third connecting member exceeds the speed of said second driven shaft.

4. In a change speed gear arrangement for a vehicle, in combination, a drive shaft; a centrifugal clutch means mounted on said drive shaft and including a freely rotatable member coupled at a predetermined speed said drive shaft to the same; a driven shaft; transmission means connecting said drive shaft with said driven shaft and including a connecting gear member loosely mounted on said drive shaft and fixedly connected to said freely rotatable member, and a gear member fixedly connected to said driven shaft; and a free wheel mechanism connecting said connecting member with said drive shaft when said connecting gear member is driven from said driven shaft by said gear member while said freely rotatable member is disengaged from said drive shaft and the vehicle is pushed.

5. In a change speed gear arrangement for a vehicle, in combination, a drive shaft; a first centrifugal clutch means mounted on said drive shaft and including a first freely rotatable member connected at a predetermined speed of said drive shaft to the same; a first driven shaft; a second centrifugal clutch means mounted on said first driven shaft and including a second freely rotatable member connected at a predetermined speed of said first driven shaft to the same rotatable member; transmission means including a first connecting gear member loosely mounted on said drive shaft and fixedly connected to said first freely rotatable member, and a second connecting gear member loosely mounted on said first driven shaft and fixedly connected to said second freely rotatable member; first free wheel means connecting said first connecting gear member with said drive shaft when said first connecting gear member is driven from said first driven shaft while the vehicle is pushed so that the speed of said first connecting gear member exceeds the speed of said drive shaft; second free wheel means connecting said second connecting gear member with said first driven shaft when the speed of said second connecting gear member exceeds the speed of said first driven shaft; a second driven shaft; gear means connecting said first driven shaft with said second driven shaft; further transmission means connecting said second connecting gear member with said second driven shaft so that when said second connecting gear member is driven from said second driven shaft, while the vehicle is pushed the speed of said second connecting gear member exceeds the speed of said first driven shaft; a third connecting gear member loosely mounted on said second driven shaft; and overrunning clutch means connecting said third connecting gear member with said second driven shaft when the speed of said third connecting gear member exceeds the speed of said second driven shaft.

6. In a change speed gear arrangement for a vehicle, in combination, a drive shaft; a first centrifugal clutch means mounted on said drive shaft and including a first freely rotatable member connected at a predetermined speed of said drive shaft to the same member; a first driven shaft; a second centrifugal clutch means mounted on said first driven shaft and including a second freely rotatable member connected at a predetermined speed of said first driven shaft to the same; first transmission means including a first connecting gear member loosely mounted on said drive shaft and fixedly connected to said first freely rotatable member, and a second connecting gear member loosely mounted on said first driven shaft and fixedly connected to said second freely rotatable member; first free wheel means connecting said first connecting gear member with said drive shaft when said first connecting gear member is driven from said first driven shaft while the vehicle is pushed so that the speed of said first connecting gear member exceeds the speed of said drive shaft; second free wheel means connecting said second connecting gear member with said first driven shaft when the speed of said second connecting gear member exceeds the speed of said first driven shaft; a second driven shaft; first gear means connecting said first driven shaft with said second driven shaft; second transmission means connecting said second connecting gear member with said second driven shaft so that when said second connecting gear member is driven from said second driven shaft while the vehicle is pushed the speed of said second connecting gear member exceeds the speed of said first driven shaft; a third connecting gear member loosely mounted on said second driven shaft; overrunning clutch means connecting said third connecting gear member with said second driven shaft when the speed of said third connecting gear member exceeds the speed of said second driven shaft; a third driven shaft; second gear means connecting said second and said third driven shaft; a third centrifugal clutch means mounted on said third driven shaft and including a third freely rotatable member connected at a predetermined speed of said third driven shaft to the same; a fourth driven shaft; third transmission means connecting said third driven shaft with said fourth driven shaft; an overrunning clutch on said fourth driven shaft; and fourth transmission means connecting said fourth driven shaft with said third driven shaft and including a third free wheel means on said third driven shaft effecting rotation of said third driven shaft when said fourth driven shaft is rotated and said third freely rotatable member is disconnected from said third driven shaft while the vehicle is pushed.

FRITZ KREIS.

References Cited in the file of this patent

UNITED STATES PATENTS

| Number | Name | Date |
|---|---|---|
| 1,795,135 | Molly | Mar. 3, 1931 |
| 1,917,501 | Cotterman | July 11, 1933 |
| 2,034,988 | Nilsson et al. | Mar. 24, 1936 |
| 2,155,132 | Henroid | Apr. 18, 1939 |